United States Patent
Rethorst

[11] 3,904,151
[45] Sept. 9, 1975

[54] SUPERSONIC UPFLOW WING

[75] Inventor: Scott C. Rethorst, South Pasadena, Calif.

[73] Assignee: Vehicle Research Corporation, South Pasadena, Calif.

[22] Filed: Mar. 16, 1973

[21] Appl. No.: 342,151

[52] U.S. Cl. .......................... 244/42 CC; 244/1 N
[51] Int. Cl. ........................................... B64c 21/04
[58] Field of Search.......... 244/42 CC, 42 CA, 1 N, 244/40 R, 40 A, 41

[56] References Cited
UNITED STATES PATENTS

| | | | |
|---|---|---|---|
| 2,891,740 | 6/1959 | Campbell | 244/42 CA |
| 3,314,629 | 4/1967 | Rethorst | 244/12 R X |
| 3,612,446 | 10/1971 | Lebert | 244/1 N |
| 3,737,119 | 6/1973 | Cheng | 244/1 N |

FOREIGN PATENTS OR APPLICATIONS

| | | | |
|---|---|---|---|
| 596,884 | 11/1925 | France | 244/42 CC |

*Primary Examiner*—Trygve M. Blix
*Assistant Examiner*—Barry L. Kelmachter

[57] ABSTRACT

Present supersonic aircraft are extremely inefficient, with part of the dissipated energy constituting a pollution product as the sonic boom. These deficiencies arise from the speed of sound compromise of the conservative forward transfer of the irrotational lifting vortex around the wing, resulting in a continuous discharge of angular momentum which is constrained by continuity from appearing in its natural vorticity form and instead is forced into a compressive form as the shock wave system. The present invention employs the propulsion jet to provide a variable density flow field under the wing to relax this constraint, enabling the discharged angular momentum to appear as dynamic vorticity to benefit lift rather than suffer thermal dissipation via the wave system. The aircraft engines and a connecting spanwise manifold are located forward to emit the propulsive jet as a sheet underneath the wing at a pressure greater than atmospheric. The jet expansion cancels the asymmetric wing compression, transforming its energy to the rotational form of vorticity concentrated in the jet immediately below the wing. This vorticity provides an aft upwash that adds to the jet velocity constituting an upward inclined flow, enabling the wing to operate at a lesser angle with a reduced drag component, corresponding to the useful work recovered from the otherwise wasted compression energy. The vorticity laden jet sustains the wing pressure through its internal structure and extends aft of the wing as a vortex flap. This longer effective chord/reduced angle wing system generates lift more efficiently via a larger mass of air, spreading downstream the pressure due to the aircraft weight, thus reducing the sonic boom.

10 Claims, 19 Drawing Figures

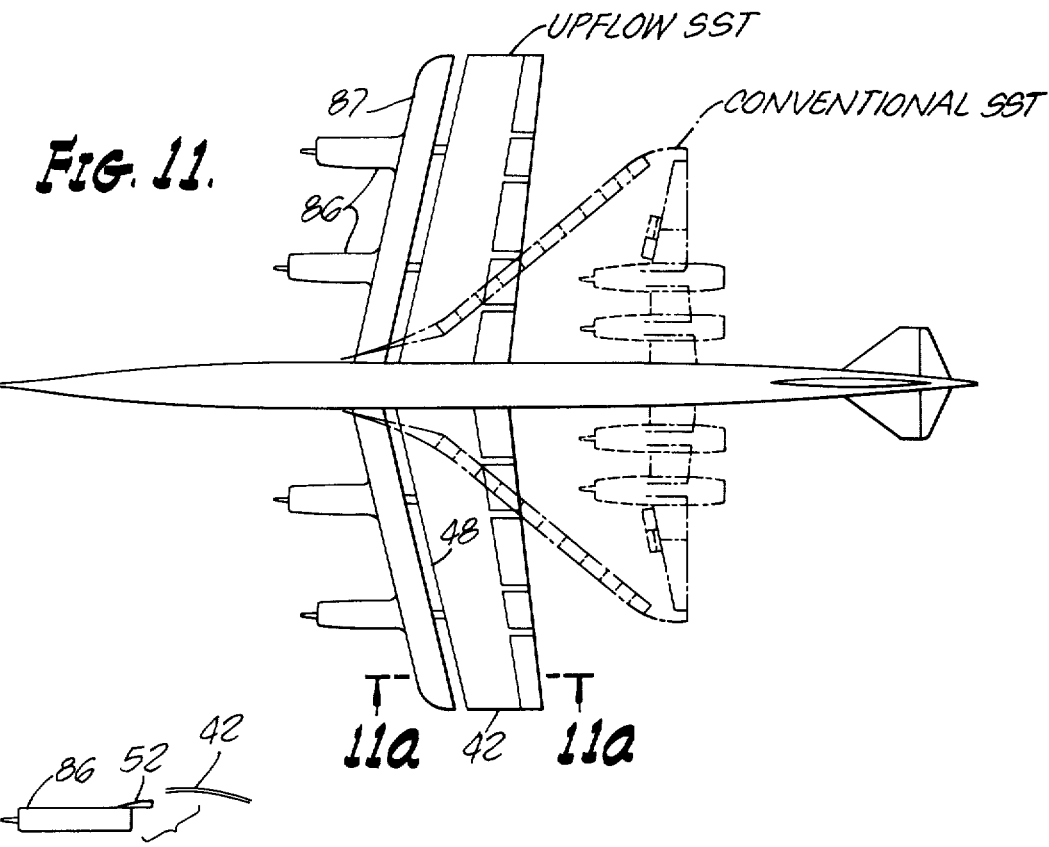
FIG. 11.
FIG. 11a.
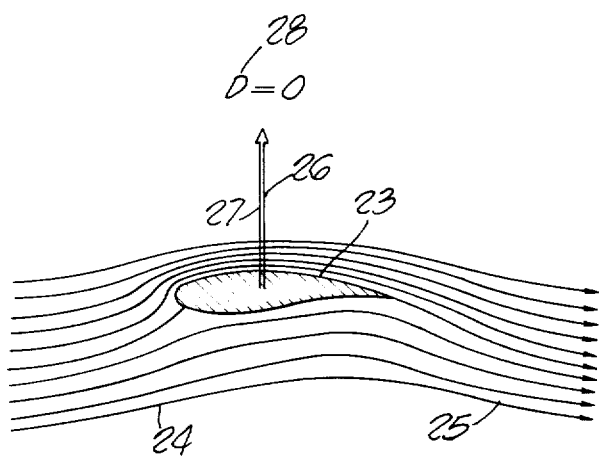
FIG. 3a.
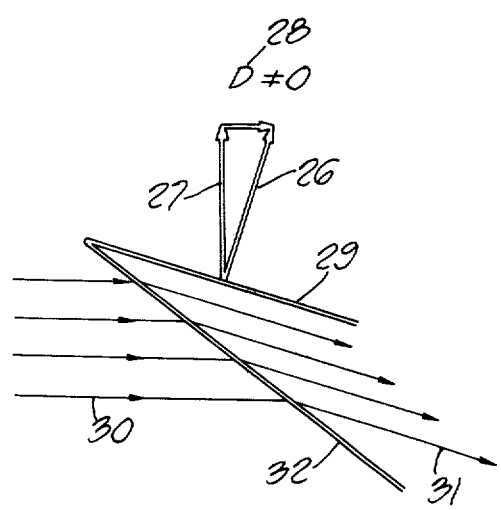
FIG. 3b.

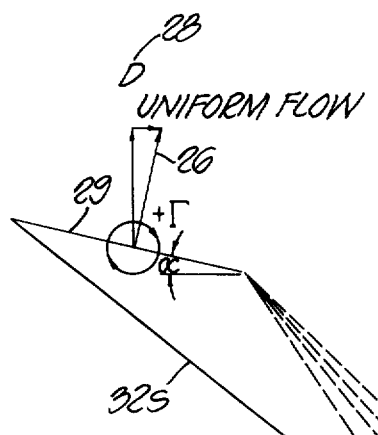
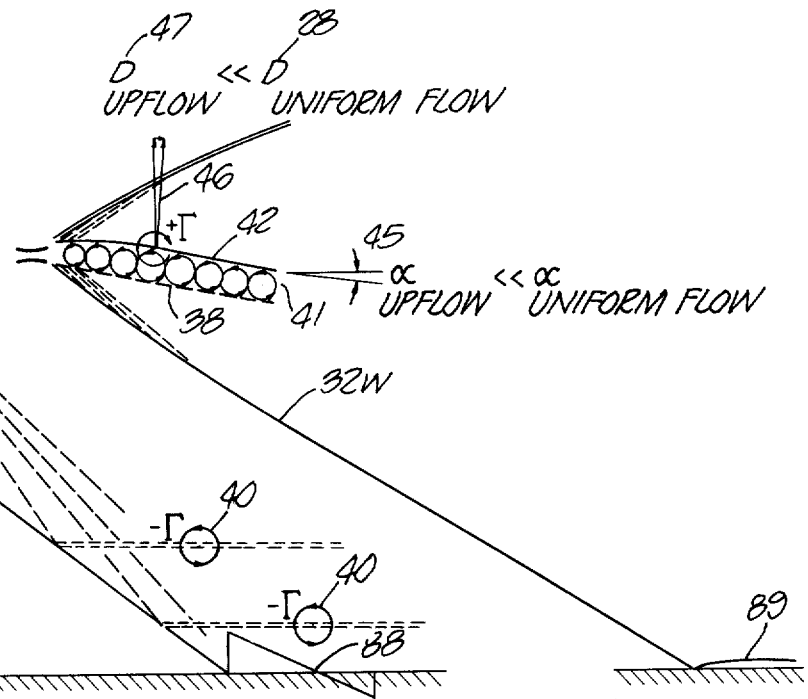
FIG. 5a.  FIG. 5b.
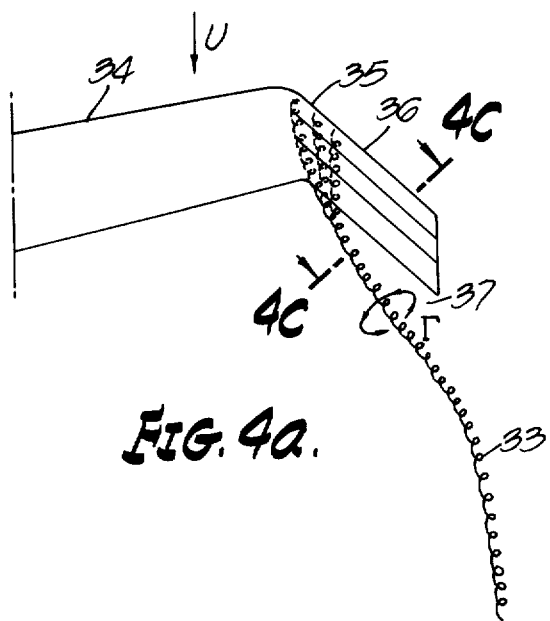
FIG. 4a.
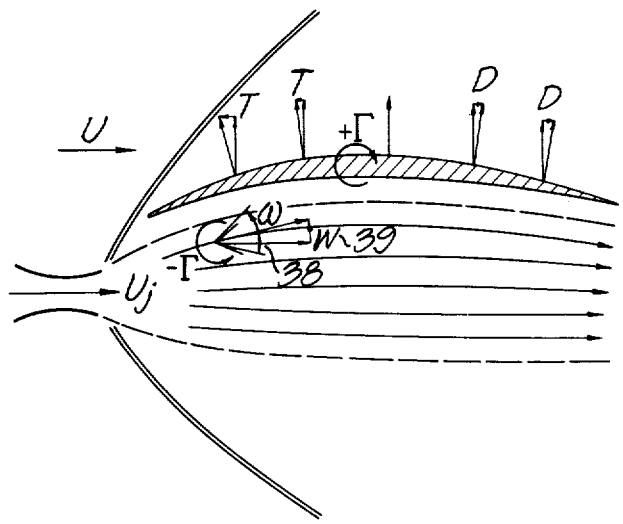
FIG. 4b.
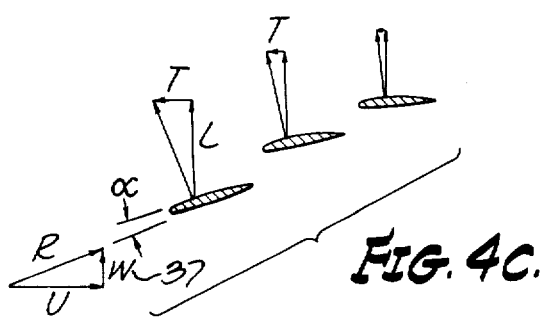
FIG. 4c.

SUPERSONIC UPFLOW WING

BACKGROUND OF THE INVENTION

No work is required by a vehicle, aside from the energy expended due to friction, to translate at a uniform speed at constant altitude, since the dot product of the gravitational force and the translational vector is zero.

The circulation lift mechanism inherently provides such a conservative system, as demonstrated by a two-dimensional subsonic wing. The angular momentum about this wing, generated by a reactive starting vortex, is transferred continuously by pressure forces to new fluid as the wing translates. The irrotational vortex comprising this angular momentum provides a forward upflow which the wing changes to an aft downflow symmetrically, leaving no residual downward displacement or velocity in the flow.

For a finite span wing, this conservative mechanism is compromised by the requirement that the pressure fall to zero at the wing tips, thereby in effect leaking angular momentum to the sides which continues as tip trailing vortices, requiring continuous replacement angular momentum. The trailing vorticity discharge is of uniform circulation strength to satisfy Helmholtz laws; yet the opposite sense of rotation of the two tip trailing vortices adds zero net angular momentum and thus satisfies Thomson's theorem. This replacement angular momentum initially appears as vorticity, but eventually decays into heat, and represents a loss of energy or drag which must be overcome by the aircraft propulsion system.

For a supersonic wing the conservative circulation lift mechanism is further compromised by the speed of sound in restricting the angular momentum constituting the irrotational vortex around the wing to the downstream Mach cone, leading to a similar discharge requiring additional replacement angular momentum. This discharge appears as the two-dimensional supersonic wave system, where it is degraded into heat directly, rather than going through the intermediate dynamic vorticity form, because of continuity constraints on the flow.

Thus compromise of the integrity of the irrotational vortex about a lifting wing results in an angular momentum discharge, which may appear either as dynamic vorticity (mechanical energy) or as the wave system (thermal energy). Discharge of this angular momentum in a dynamic vorticity form offers the potential of its energy recovery; discharge in a thermal form precludes any possibility of such energy recovery. Furthermore the constraints on the discharge of angular momentum imposed by Helmholtz laws and Thomson's theorem do not extend to the energy of this discharge, which may accordingly be minimized by increasing the mass of air involved, thereby in effect recovering energy from the angular momentum discharge, most simply by utilizing its upwash.

In particular the energy associated with dynamic vorticity discharge of the finite span wing can be recovered by downstream upwash utilization. Perhaps the simplest demonstration of this energy recovery system is aircraft flying in formation, where the upflow from the wing tip vortex of the leading element provides a drag reduction for the aircraft flying slightly behind and off the wing tip. This same mechanism is used by formations of migratory birds.

This upflow mechanism enables an aircraft to recycle a portion of its own trailing vortex energy, as in the Outflow Wing induced drag reduction system disclosed in my U.S. Pat. No. 3,712,564 issued Jan. 23, 1973. This system employs an outflow wing comprising a cascade outer wing panel, arranged so that each cascade element benefits from the upwash of its forward neighbor, like the formation aircraft. To accomplish this the outflow wing discharges its trailing vortex inboard from the wing tip by a sharp washout of the angle of attack. The outer wing panel is swept aft to deflect the flow outboard, with this panel lying in the upwash of the trailing vorticity transported by the outward deflected flow. The cascaded outer panel laminates an expanded vortex core that has less energy, which corresponds to a greater effective span, thereby reducing induced drag. This vortex energy recovery system is used by all soaring birds.

The potential for vortex energy recovery is shown by the well-known expression for the rotational energy of a pair of wing tip trailing vortices, i.e., $$E_{rot} = \frac{\rho \Gamma^2}{2\pi} \left[ \ln \frac{2b'}{r'} + \frac{1}{4} \right]$$

where
$\Gamma$ = circulation strength
$\rho$ = air density
$b'$ = semi-span distance between vortex centers
$r'$ = vortex core radius This expression provides a quantitative demonstration that expansion of the vortex core radius $r'$ reduces the energy of the vortex, corresponding to a reduction in induced drag.

BRIEF SUMMARY OF THE PRESENT INVENTION

The present invention provides a further downstream upflow mechanism in supersonic flow in the form of a compressible flow vortex. This new mechanism first releases the supersonic angular momentum discharge in dynamic vorticity form, and second provides a configuration arrangement to again utilize the downstream upwash produced by the vorticity to reduce drag. This system thereby recovers the vortex energy by generating an aft upflow under the supersonic wing to provide a symmetric flow field fore and aft, thereby achieving lift/drag (L/D) ratios of the same order as a subsonic wing.

This is accomplished by locating the propulsive engines forward and under the wing, and arranged to provide the necessary aft upflow to the wing. A spanwise jet is emitted from the engines with an excess in static pressure, which causes the jet flow to expand or decrease in density. This expansion field cancels the compression field generated by the wing, particularly in its upper region, thereby providing a velocity gradient in the jet, corresponding to a release of negative vorticity, providing an aft upflow. Again the mechanism expands the vortex cores by their concentration in the jet, providing an increased vortex core radius $r'$ with its corresponding energy or drag reduction.

The wing is then located in this upflow, preferably above the jet itself to avoid contact with hot air or exhaust from the engine.

This invention is thus an improvement to that contained in my U.S. Pat. No. 3,314,629. This prior patent disclosed an aircraft lifting system comprising a spanwise converging-diverging nozzle emitting a supersonic jet of fluid underneath the surface of a supersonic wing. The present application pertains to an improvement in the flight efficiency and sonic boom reduction by shaping the converging-diverging nozzle to emit the jet in an underexpanded manner, with a pressure greater than atmospheric. The compression waves generated by the wing are then cancelled by the expansion of the jet, thereby releasing and concentrating the compressible flow vorticity in the jet itself immediately underneath the wing, where its upflow enables the wing to operate at a reduced angle of attack, with a corresponding drag reduction.

BRIEF DESCRIPTION OF THE DRAWINGS

The foregoing and other readily apparent features of my present invention will be better understood by reference to the following more detailed specification and accompanying drawings in which:

FIGS. 3A and 3B illustrate the comparative upstream upflow mechanisms in two-dimensional flow for subsonic and supersonic wings respectively.

FIGS. 4A and 4B illustrate two downstream upflow mechanisms for energy recovery from (a) a wing-tip trailing vortex in subsonic flow, and (b) a compressible flow vortex in supersonic flow respectively.

FIG. 4C is a sectional view along line 4C—C of FIG. 4A.

FIGS. 5A and 5B illustrate the comparative angular momentum discharge patterns of (a) a conventional wing in uniform flow, and (b) the upflow wing in non-uniform flow respectively.

FIG. 6 illustrates the detailed upflow mechanism of the present invention.

FIG. 8 illustrates the upflow wing performance improvement provided by vorticity concentration in the jet under a supersonic wing.

FIG. 11 illustrates the comparative configurations of (a) the upflow SST and (b) a conventional SST.

FIG. 11A is a sectional view along line 11A—A of FIG. 11.

DETAILED DESCRIPTION OF THE PREFERRED EMBODIMENT

In the following paragraphs like numbers refer to the same or similar items from figure to figure.

Figure 2:
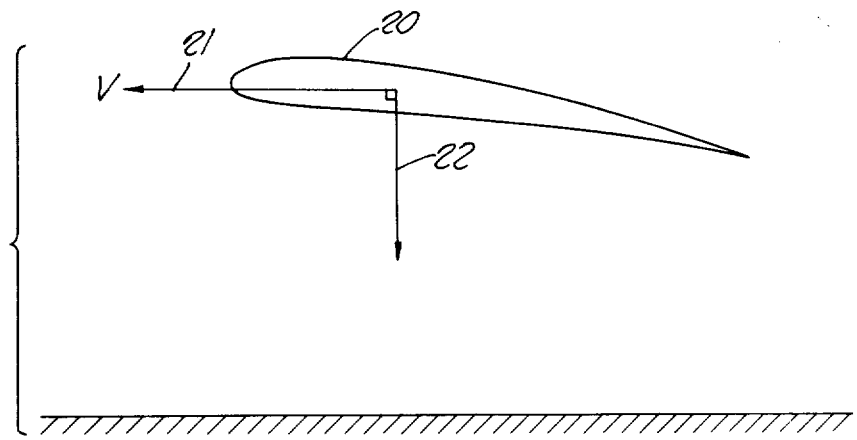
FIG. 2 is a view of an aircraft wing translating at a uniform altitude showing that the velocity vector is orthogonal to the earth's gravitational force field.

Translation of an aircraft wing 20 at a constant altitude requires no energy, aside from that expended due to friction, because as illustrated in FIG. 2 the velocity vector 21 is orthogonal to the earth's gravitational vector 22.

Achievement of such a conservative lift force by a fluid dynamic mechanism requires a symmetric up and down flow field as illustrated in FIG. 3A, where a conservative subsonic flow about a two-dimensional wing 23 is illustrated, wherein the forward upwash 24 is symmetric with the aft downwash 25. The change in momentum from the forward upflow to the aft downflow thereby produces a reaction force 26 in accordance with Newton's second law, which constitutes the lift 27 and has a zero drag force component 28 due to the symmetry.

This upstream upflow mechanism is limited to subsonic speeds, because at supersonic speeds, as illustrated in FIG. 3B, limitations of the speed of sound prevent the pressure imparted to the fluid by the supersonic wing 29 from being transmitted forward to provide a symmetric upflow forward. Hence the forward flow 30 arrives at the wing horizontal, and the entire reaction force 26 must then be generated by turning this flow downward 31. To accomplish this turning the supersonic wing 29 generates a downward shock wave 32, and the wing 29 itself must necessarily be inclined downward to the rear, and the resultant force 26 so generated is inclined back having a slightly reduced lift component 27 and an aft component 28 appearing as a non-conservative drag force.

Limitations of the speed of sound do not preclude operation of downstream upflow mechanisms, such as are illustrated in FIG. 4. In particular, in FIG. 4A the energy contained in the wing tip trailing vortex 33 from a finite span wing 34 can be located inboard by washout 35 of the wing angle of attack and aft sweep of the outer panel 36 to position it in the upflow 37 of the trailing vortex 33, thereby recovering a substantial part of its otherwise wasted energy. The supersonic counterpart of this mechanism is illustrated in FIG. 4B, where the compressible flow vortex 38 is located by the wing/jet geometry of the present invention so as to enable the wing to operate in the upwash 39 generated by this vortex, as described more fully below in connection with FIG. 6.

The above described limitation of forward pressure transmission of a two-dimensional supersonic wing discharges angular momentum continuously into the flow. For a conventional wing 29 in uniform flow, as illustrated in FIG. 5A, this discharge appears as strong shock wave 32s where its energy is primarily degraded into heat, and secondarily into vortex sheets 40 throughout the wake far below the wing, where it is not readily recoverable. In the present upflow system, as illustrated in FIG. 5B, the angular momentum is discharged from a two-dimensional supersonic wing in the form of dynamic vorticity 38 concentrated in the propulsive jet 41 immediately thereunder in such a way that its upwash 39 will add to the axial flow 43 to provide an upward inclined flow field 44 for the upflow wing 42. The wing is then located in this upflow, preferably above the jet itself to avoid contact with hot air or exhaust from the engine. In this manner a large portion of the vortex energy can be recovered into lift, thus minimizing the energy eventually discharged into the wake in the weak shock wave 32w.

Figure 1:
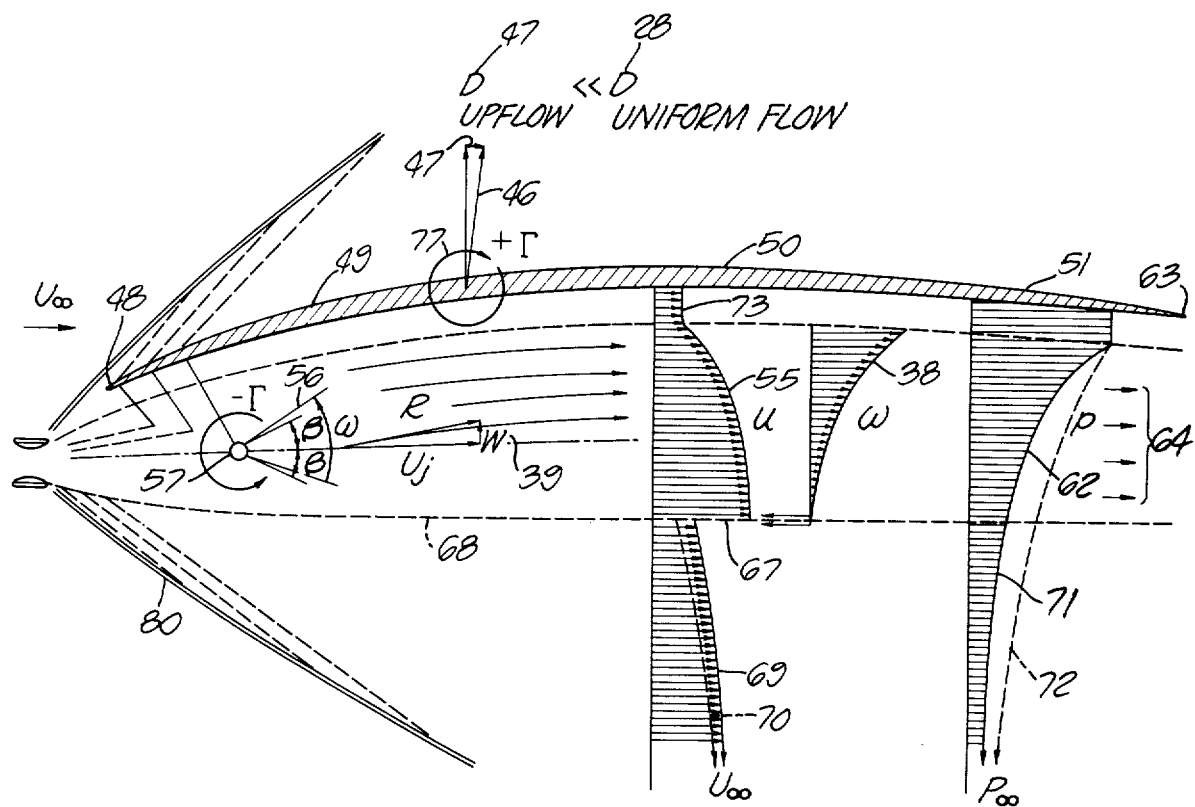
FIG. 1 is a cross-sectional view of the wing and converging/diverging nozzle emitting an expanding jet thereunder, showing details of the flow field.
Figures 6, 8:
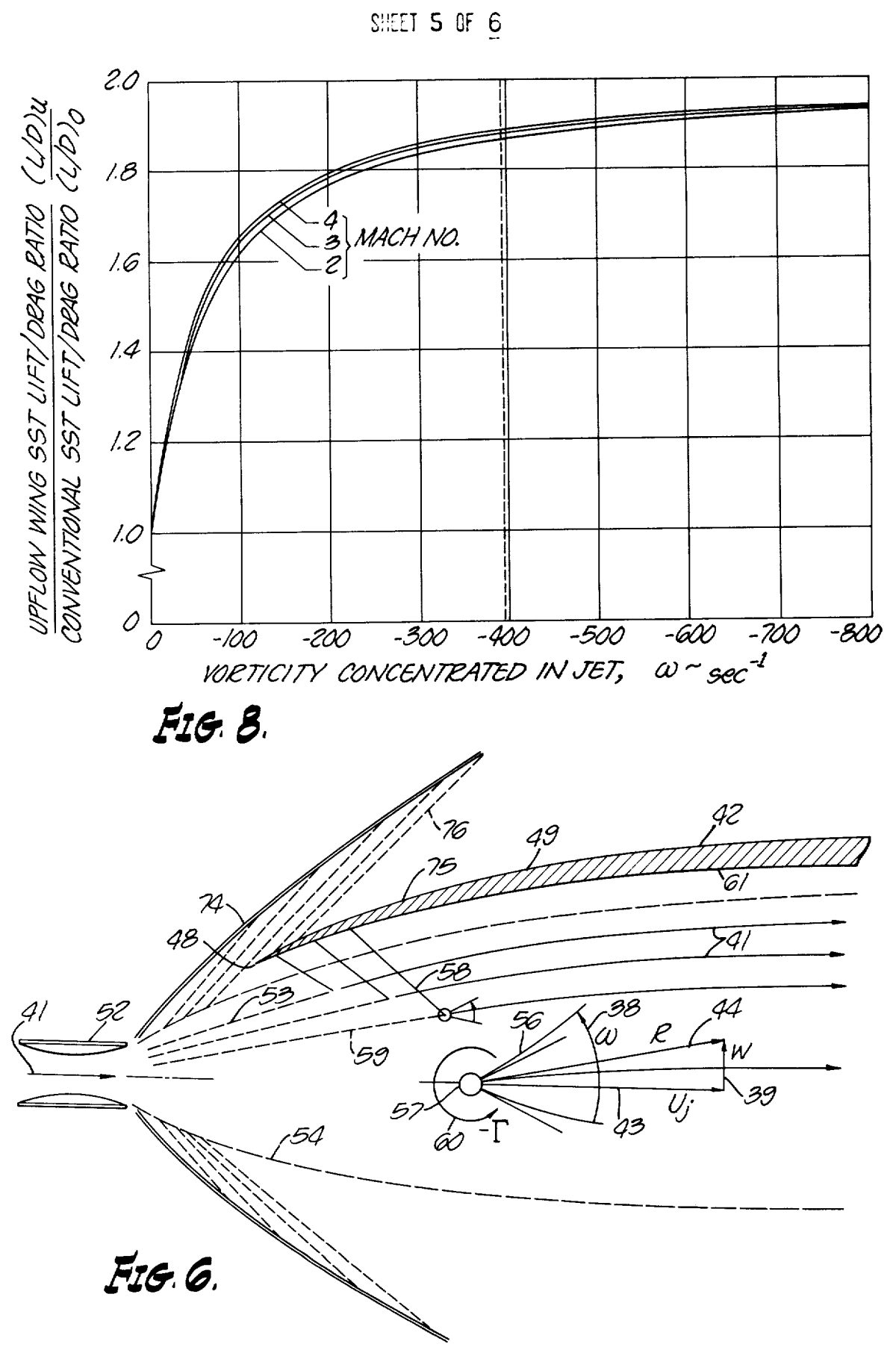

The objective of the present invention as shown in FIG. 6 is accordingly to provide an upward inclined flow field 44 for the wing. This new mechanism as shown in FIGS. 1 and 5 will allow the wing to operate at a reduced angle 45 and tilt the force 46 on the wing forward with a reduced drag component 47.

A correlary to this mechanism must be the discharge of less energy into the wake, corresponding to (1) a reduction in the strength of the leading edge shock wave 32, and (2) the role of the vorticity concentrated in the jet under the wing in spreading the downward momentum over an increased mass of air ("effective" increase in wing chord).

The upflow wing model is comprised of a two-dimensional wing 42 with an aft directed spanwise jet 41 emitted under its leading edge 48. For convenience, the wing 42 may be regarded as comprising three panels in the chordwise direction, a forward 49, center 50, and aft 51, panel as shown in FIG. 1. The jet nozzle 52, forward panel 49, and interacting-flow 41 thereunder are illustrated in detail in FIG. 6.

The two-dimensional jet 41 is emitted at a pressure greater than atmospheric, so that initially it expands up and down. The initial vertical pressure and velocity profiles of the jet would be skewed to provide (a) higher pressure and hence a greater expansion potential in the upper part of the jet 53, and (b) higher velocity and hence greater resistance to downward deformation at the bottom of the jet 54.

The forward wing panel 49 turns the upward inclined flow 53 towards the horizontal, yet permitting sufficient expansion in the upper region of the jet to cancel the compression provided by the forward panel in turning the flow.

The lower region 54 of the jet will be less constrained because of its remoteness from the upper wing, and will accelerate more. This asymmetry will provide a normal velocity gradient 55 in the jet, corresponding to negative vorticity 38 about a spanwise axis, as shown in FIG. 1.

The asymmetric velocity or Mach number will provide a skewed Mach cone 56 from each vortex 57 generated by cancellation of the wing compression 58 by the jet expansion 59.

The negative sense of rotation 60 will provide upwash 39 within the skewed Mach cone 56 downstream from each vortex, which adds to the axial flow 43 to provide upward curved streamlines 44 in the upper region of the jet 53 under the center wing panel 50, sustaining a greater pressure on the wing undersurface 61 than at the bottom of the jet 54, thus providing a normal pressure gradient 62 in the jet 41.

The center wing panel 50 is shaped to contain the pressure at the desired value for lift, with minimum further compression 58 of the flow.

The aft wing panel 51 is shaped to permit the jet 41 to expand to atmospheric pressure at the wing trailing edge 63 thereby avoiding any pressure defect. The increased velocity due to this expansion of the jet avoids any velocity defect at the trailing edge of the wing, with the jet 41 continuing thereafter as a vorticity-laden jet stream 64.

The jet continues aft of the trailing edge 63 of the wing 42 as a jet stream 64, not in the usual sense of a high axial momentum jet flap, but rather as a jet containing only sufficient axial momentum for efficient propulsion, but with additional momentum in the rotational form of vorticity 38, which combine to produce a pressure gradient. The mechanism induces an aft component in the flow below the jet, thereby spreading the pressure downstream. Thus the jet aft of the wing is not really a jet flap, but more properly a shear layer or vortex flap.

The additional lift on the wing undersurface 61 provided by the upwash 39 (a) does not appear at the bottom of the jet 54 because the pressure gradient 62 is sustained through the jet itself by the greater curvature of the streamlines in the upper region 53 of the jet due to the upwash 39 from the skewed Mach cones 56, and (b) is not contained directly in axial momentum of the jet stream 64 aft of the wing, but rather as rotational momentum 38 in this jet which then appears as pressure spread downstream due to the vortex field of the jet.

The thickness of the jet is not restrained by the mechanism described, and can be determined by the propulsive requirements. The chord length of the forward panel 49, on the other hand, will be related to the jet thickness, and the thinner the jet, the shorter the chord of this forward panel.

The basic constraint is that the density increase 58 imposed by the wing be of opposite sign to the density decrease 59 of the expanding jet, so that the density changes cancel, thus reducing the work lost in fluid compression. The pressure inputs, however, will be of like sign and hence additive, thereby increasing the lift. Hence for the same lift the angle of attack 45 of the wing can be reduced, with a reduction in drag.

The basic physics, flow field, and structure of the above physical model are described in more detail as follows:

A lifting wing at supersonic speeds compresses the flow underneath. The strength and distribution of this compression is determined by the camber, angle of attack, and other geometrical features of the wing lower surface.

This compression arises from the absence of pressure forces to turn the flow, because of the limitations of the speed of sound, requiring compression of the fluid to invoke viscous forces to turn the flow. This compression is expressed by Euler's equation, namely $$\frac{d\rho}{\rho} = -M^2 \frac{dU}{U}$$

where
$\rho$ = air density
$M$ = Mach number
$U$ = velocity

Figure 7A:
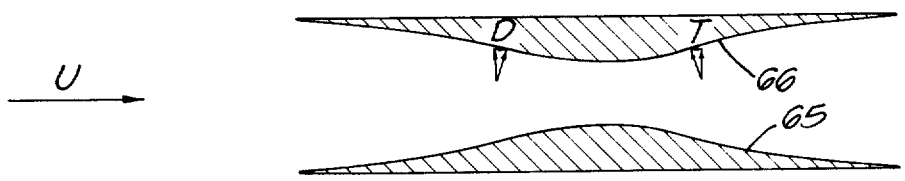
FIGS. 7A and 7B illustrate the comparative energy recovery systems of (a) the symmetric flow through a Busemann Biplane, and (b) the unsymmetric flow under the upflow wing respectively.

The work involved in this compression represents an energy loss unless some structure or mechanism is provided to recover this energy. In a symmetric flow, such as in a Laval nozzle or Busemann biplane, the fluid is allowed to re-expand in a diverging section 65 where the increased pressure has a component 66 in the flow direction, providing work, as shown in FIG. 7A. This system thus includes a means of recovering the compression energy, thereby providing an isentropic process.

Figure 7B:
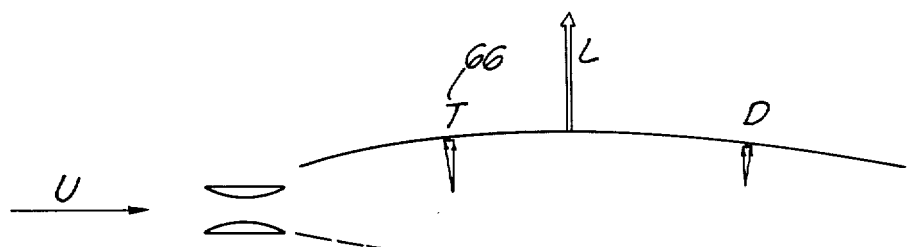

In the unsymmetric flow under a conventional lifting wing 29, the viscous forces that turn the flow invoke a continuous discharge of angular momentum which appears as the shock wave 32 and vortex sheets 40. The upflow wing 42 forces this discharge to appear primarily in the form of dynamic vorticity 38 in jet immediately below the wing, where a substantial portion of its energy can be recovered into lift, as shown in FIG. 7B. The increased lift allows the wing to operate at a reduced angle of attack 45, thereby reducing the asymmetry, so that the net result, as with the Busemann biplane, is a recovery of energy in the form of thrust 66, corresponding to a reduced drag 47. Thus in effect the vorticity 38 is concentrated in the jet in such a manner as to provide a pressure gradient 62 as shown in FIG. 1, which simulates the lower surface of a Busemann biplane.

The upflow wing system 42 in effect recycles the wing compression energy 58 into production of incremental lift, permitting a reduction in angle of attack, thereby reducing the drag. This recycling is achieved by using the engine thrust energy as a catalyst, which provides an expansion field 59 to limit the wing compression field 58 to a small region while releasing the negative vorticity 38 and its associated upflow 39. This recycling mechanism is thus a chain reaction in the downstream or flow direction, necessarily within the downstream Mach cone 56 from the compression/expansion interaction 57.

From another point of view, the negative vorticity released in the jet introduces a forward perturbation flow under the wing, providing a retardation of the total flow, corresponding to an increase in pressure. To the extent that this vortex flow 38 provides the pressure increase 62, the requirement for flow compression 58 by the wing with its attendant work and energy is reduced. That is, the compression of the flow by the wing is restricted to a smaller mass of fluid in the immediate neighborhood under the forward part 49 of the wing, and further compression downstream and below is obviated or greatly reduced by the pressure gradient 62 provided by the vorticity. Thus the recycling of vortex energy avoids much of the usual flow compression 58 with its attendant energy loss.

The forward wing panel turns the flow to generate pressure, with a corresponding increase in density. Normally, this compression field extends below the wing and decays gradually. However, a short distance below the wing, the expansion 59 provided by the jet 41 cancels much of this compression field 58. This cancellation mechanism involves releasing vorticity 38 in the jet just as the normal decay of the shock wave 32 is associated with vorticity release 40. The significant difference is that for the upflow wing 42 the vorticity 38 is released in a concentrated form in the jet 41 before the weak compression waves 58 can coalesce into a strong shock 32 which would directly degrade the vortex energy into heat. The concentrated vorticity so released then continues aft with the jet stream under the center wing panel 50, which accordingly may be of reduced deflection, performing the role of simply maintaining the pressure 62 now provided by the upwash 39 associated with this vorticity 38, thus reducing the requirement for further turning and/or compression of the flow. The aft panel 51 could reduce the curvature even further, so as to provide ambient pressure at the trailing edge 63 of the wing for smooth shock free flow at the trailing edge.

This mechanism is one of recycling otherwise wasted energy, and thus has the potential of providing a net gain in performance efficiency while materially reducing sonic booms which are a manifestation of inefficiency. Present systems which require the expenditure of additional energy to reduce sonic booms obviously incur a preformance penalty. This illustrates the principal advantage of using wasted energy (recycle mechanism).

FIG. 1 illustrates the flow properties described, namely (a) the velocity $u$, (b) the vorticity $\omega$, and (c) the pressure $p$. The quantitative determination of this flow field is discussed in following sections.

The vertical variation of velocity $u$ or the velocity profile 55 illustrates the effect of the vortex perturbation flow in reducing the velocity in the upper part of the jet 53 and under the wing, as compared to the increased velocity in the lower part of the jet 54. The sharp decrease 67 in velocity at the lower boundary 68 of the jet is also illustrated, and the increased total velocity 69 below the jet provided by the vortex perturbation increment is shown in a solid line for comparison with the usual velocity profile 70 shown dashed.

The vorticity profile $\omega$ 38 illustrates the concentration of the vorticity in the upper part of the jet 53. This profile is consistent with the higher velocity gradient 55 in this upper region. Further, this vorticity 38 is negative and is thus associated with upflow 38 as illustrated on FIG. 1.

The pressure profile $p$ 62 illustrates the vertical pressure gradient through the jet, and in particular the increase in pressure in the upper part 53 of the jet. The lesser pressure rise 71 below the jet caused by the vortex upflow 39 is shown solid as compared with the usual profile 72 shown dashed.

The dashed and solid lines in the profiles shown in FIG. 1 basically illustrate the additional benefit derived from negative vorticity 38 generation. Without the vorticity, the jet would be deflected downward to a greater extent by the pressure generated from the wing. The outer flow beneath the jet would then in turn be subjected to greater downward deflection. This greater downward deflection is associated with higher static pressures (greater compression) and greater velocity decrease (as depicted by dashed lines on the presure and velocity profiles). Thus, vorticity generation in the jet limits or reduces the compressive field produced by the lifting wing.

The vortex mechanism, in providing a significant vertical velocity gradient 55 in the jet, enhances the mixing process and transfer of jet energy to the flow in the gap 73 between the jet 41 and the wing 42, thereby providing on the wing undersurface 61 itself the increased pressure 62 developed by the vortex mechanism in the jet. The energization of the gap flow in the presence of the wing boundary provides jet augmentation which further enhances the propulsive efficiency of the system.

As shown in FIG. 6, the upward directed shock wave 74 generated by the expanding jet 41 will provide an increased pressure on the forward upper surface 75 of the wing, relative to the free stream pressure. However, the lower surface 61 of the wing experiences the same increase in pressure due to this shock, and hence the difference in pressure, which constitutes the lift 46, is unaltered.

This shock above the wing is rapidly attenuated due to the upward expansion field 76 from the forward upper surface 75 of the wing, and hence the energy loss from this flow field above the wing will be minor.

The increased pressure developed by the upflow 39 under the wing 42 enables the wing to operate at a reduced angle of attack 45. Hence for the same lift, the drag force 47 will be reduced. Since the angular momentum 60 shed by the wing has the same strength as the positive vorticity 77 producing the lift, in accordance with Thomson's theroem, and with its release in the form of dynamic vorticity and largely concentrated in the jet 41, then the upflow 39 generated under the wing will approach as an upper bound the downflow 31 produced by the wing itself. The flow under the wing will then be symmetric fore and aft, and the wing can be provided with sufficient camber to accommodate this inclined flow 44 such that the resultant force 46 on the wing is vertical and hence conservative. Thus in the limit, this would represent zero wave drag, approaching the subsonic condition.

A quantitative determination of the performance improvement provided by the vorticity concentration mechanism described will require a mathematical formulation of the flow field. In such a formulation the flow in the jet under the conditions described may be represented mathematically by the momentum equations together with (1) suitable boundary conditions representing the wing, and (2) initial conditions representing the jet characteristics. In particular, the momentum equations may be combined with the equation of state and solved for pressure in terms of the velocity field, including explicitly the vorticity of this field.

Such a formulation will require finite difference numerical calculations to determine the complete flow field. However, an approximate analysis has provided a simple estimate of the performance improvement in demonstrating that the pressure in the nonuniform flow field under the wing is of the order $$p_{rot} \approx p_{irr} \exp\left(-\left(\frac{M\gamma}{a}c\alpha\omega\right)\right)$$

where $P_{rot}$ = pressure in a rotational flow field
$P_{irr}$ = pressure in an irrotational flow field
$M$ = Mach number
$\gamma$ = gas constant
$a$ = speed of sound
$c$ = wing chord length
$\omega$ = vorticity
$\alpha$ = wing angle of attack This expression denotes the pressure 62/71 in the rotational field in terms of the pressure 72 in an irrotational field. The latter can be obtained explicitly in simplified cases from linearized theory, and hence the above expression can show the modification to this pressure due to vorticity concentrated in the jet.

The exponential includes the Mach number, showing that the increase in pressure due to rotation vanishes for incompressible flow, but increases sharply with Mach number. Physically, this reflects the confinement of the effective vorticity to the downstream Mach cone from a vortex source, restricting the perturbation flow to an upwash because of the negative vorticity.

The negative vorticity 38 itself also appears in the exponential, demonstrating that the pressure increases strongly with the strength of the vorticity.

For cruise operation at a constant altitude, the pressure or lift will be maintained constant and equal to the weight, and hence the increased pressure 62/71 would be used to reduce the angle of attack 45 with a corresponding drag reduction 47. The attendant reduction in wing pressure drag 47 due to the reduced angle of attack 45 can then be used to estimate the improvement in lift/drag ratio, which can most conveniently be calculated normalized to the lift/drag (L/D) ratio for large conventional SST aircraft, where the drag due to lift is approximately one-half of the total drag. This improvement in lift/drag ratio provided by the compressible vortex upwash is shown by the following expression:

$$\frac{(L/D)_u}{(L/D)_o} = \frac{2 - 2\frac{\sqrt{M^2-1}}{M}\frac{c}{a}\omega}{2 - \frac{\sqrt{M^2-1}}{M}\frac{c}{a}\omega}$$

This expression is plotted in FIG. 8 to show the upflow wing SST lift/drag ($L/D$) ratio in terms of the lift/drag ($L/D$) ratio for a conventional SST as a function of the vorticity concentrated in the jet. The plot demonstrates a very favorable trend in the neighborhood of small vorticities where the greatest performance improvement is provided. Further, this gain is not sensitive to Mach number changes in the operating range of interest. FIG. 8 shows that the lift/drag ($L/D$) ratio can be essentially doubled by concentrating approximately one-half of the angular momentum discharge in the form of dynamic vorticity 38 in the jet 41 under the wing 42.

The drag reduction provided by the vorticity concentration/upflow mechanism must correspond to a decrease in the energy discharged into the wake.

The velocity and pressure profiles under the wing were illustrated in FIG. 1. These profiles 55 and 62 respectively are essentially reversed as the jet passes through an inflection point at the trailing edge of the wing 63, where the pressure containment of the wing terminates. The vorticity profile 38 is essentially unchanged and basically reflects the vorticity released from wing compression waves 58. The wing trailing edge 63 may be reflexed to recover some thrust, but probably better simply terminated to avoid loss of lift. In any event, the higher pressure in the upper part of the jet will cause that region to initially expand upwards 78, as shown in FIG. 9A.

As the jet passes under the tailing edge of the wing, it contains (1) a small axial momentum increase compatible with high propulsive efficiency, and (2) a relatively large concentrated rotational momentum 38 derived from the wing compression process 58. Aft of the wing the jet thus has characteristics of both a jet flap, because of axial momentum, and a vortex flap, due to rotational momentum. Usually, jet flap characteristics due to axial momentum effectively extend only a relatively short distance until the flow is bent back to the horizontal. However, for the vorticity-laden flap the rotational momentum characteristics are independent of the jet curvature, as is the axial momentum itself, thus providing the vortex flap pressure differential for an extended length.

Figure 9A:
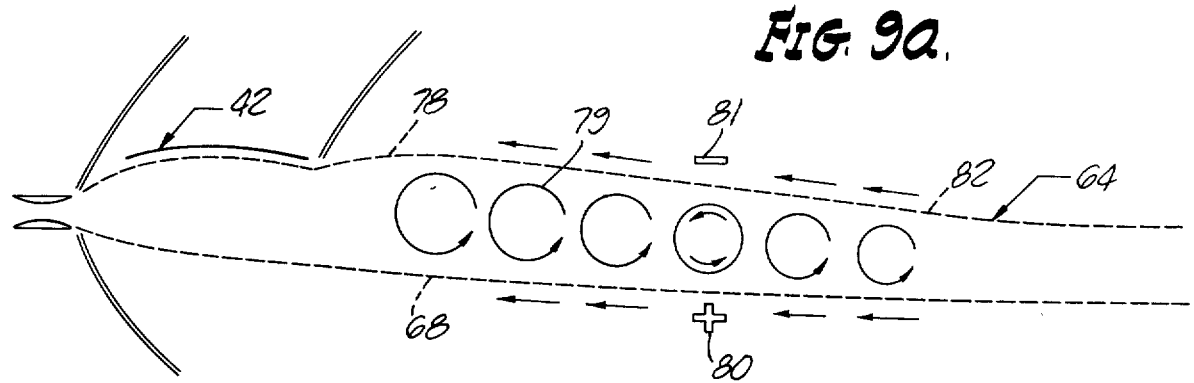
FIGS. 9A and 9B illustrate (a) the vortex flap extending aft of the upflow wing in a coordinate system fixed to the jet, and (b) the coordinate transformation from a system fixed to the wing to a system fixed to the jet respectively.

The vortex flap mechanism may be regarded as similar to the well-known rotating cylinder, as shown in FIG. 9A. In this model, the vorticity concentrated in the jet can be viewed as emerging from under the trailing edge of the wing as a series of rotating cylinders, perhaps in analogy with an unsymmetric half of a Karman vortex street. Each such rotating cylinder 79 is translating at the higher speed of the jet 41 and would then develop a positive pressure 20 on its lower side 68 and a negative pressure 81 on its upper side 82, due to the outer flow past the cylinder, which arises from the differential in axial velocity of the jet with respect to the outer stream.

Figure 9B:
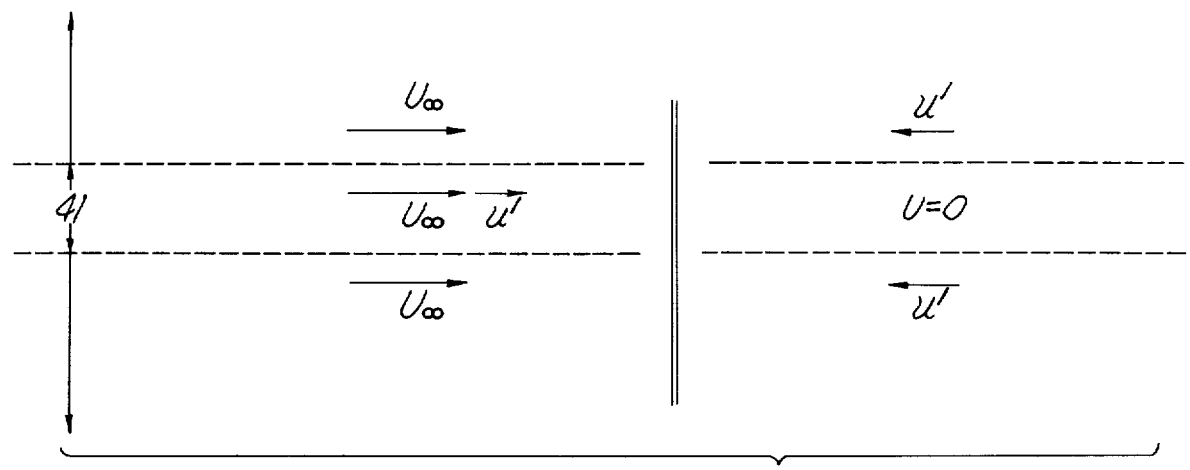

This velocity differential is best illustrated in a coordinate system fixed to the jet, as shown in FIG. 9A, where the transformation from the usual coordinate system fixed to the wing is shown in FIG. 9B. This figure then illustrates the features of the vortex flap as described, showing (1) the positive pressure 80 on the lower side of the jet 64 arising from the outer flow opposite in direction to that of the rotating cylinder, and (2) the negative pressure 81 on the upper side where the outer flow is the same direction as that of the rotating cylinder.

The force developed on the vortex flap 64 and illustrated by this rotating cylinder analogy of course is actually supported by pressure gradients in the jet itself. These pressure gradients in turn arise from the skewed velocity and pressure profiles of the jet as it is discharged from the trailing edge of the wing 63. The precise nature of these gradients and the detailed internal pressure gradient mechanism can be determined only by a numerical solution. The analogy shown here is merely a simple plausibility representation.

The longer effective wing chord provided by the vortex flap mechanism described above is illustrated in FIG. 10. The vortex flap is compared with a conventional wing and a conventional wing/jet flap system under conditions of equal total lift and equal wing chord.

Figure 10A:
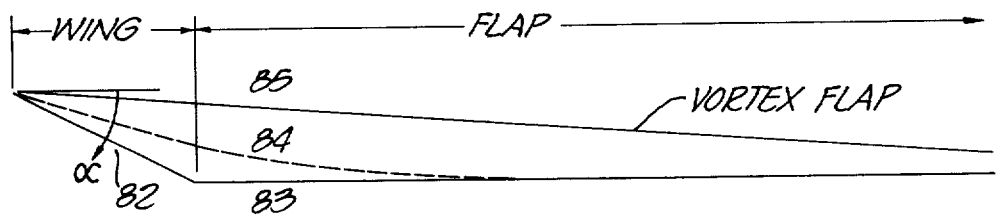
FIGS. 10A and 10B illustrate the increased effective chord provided by the vortex flap in terms of (a) the attack angle distributions, and (b) the pressure distributions below the jet respectively.

FIG. 10A illustrates the angles of attack of (i) a simple flat plate wing 83, (ii) a wing at a reduced angle of attack having a conventional axial momentum flap 84 that increases the "effective" wing chord by a relatively short amount, and (iii) a wing at an even smaller angle of attack augmented by a rotational momentum vortex flap 85 that provides a long "effective" chord.

Figure 10B:
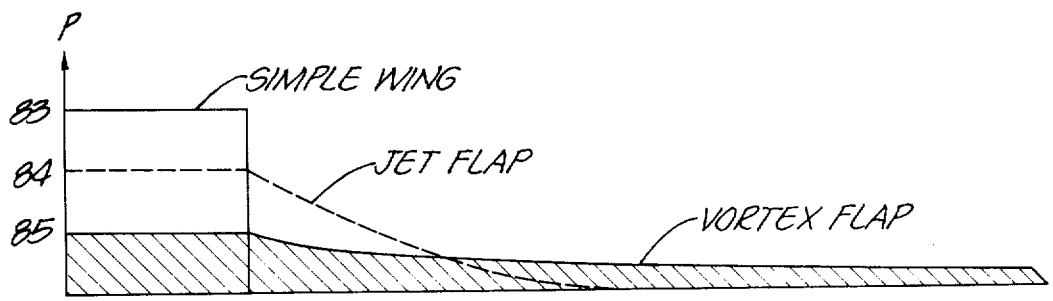

FIG. 10B shows the corresponding pressure distributions on the bottom of the jet for the three wing systems of FIG. 10A. Curve 83 has the highest pressure corresponding to the shortest chord. Curve 84 shows the reduced pressure provided by the increased effective chord of a jet flap, which falls off rapidly downstream. Curve 85 illustrates the further reduced pressure corresponding to the longer effective chord of the vortex flap, which persists further downstream. The area under each of these three curves must of course correspond to the weight of the aircraft.

Thus the upflow system constitutes a double wing; the vorticity is used first under the wing to generate increased lift at a reduced angle of attack, the second aft of the wing to provide a sustained vortex flap. The vorticity is generated or released via interaction of the expanding jet with the unsymmetric wing compression; it is diffused aft of the wing through a process which persists longer than the effect of axial momentum alone as illustrated by the rotating cylinder analogy.

The basic propulsion system requirement for the upflow SST is identical with that of a conventional SST, and hence present or projected conventional rotating machinery gas turbines 86 would be employed.

There is of course the added requirement for a lateral manifold 87 to provide the spanwise jet required as shown in FIG. 11. This manifold, however, offers the opportunity for functional integration so that it is not necessarily simply added structure. For example, it could serve a double purpose to provide external blown flaps at take-off and possibly afterburning at cruise.

In particular, the installation would appear to favor fan engines 86, with the hot exhaust discharged directly, and the fan air employed as the spanwise jet 41, being ducted spanwise at relatively high pressure for discharge through a converging/diverging nozzle 52. Such a system would involve a greater mass flow and hence a higher propulsive efficiency. Furthermore, the fan air could be used dry to provide quiet lift augmentation for take-off, with remote afterburning if used at all employed only at altitude.

A further possibility is the use of a two-dimensional ram-jet for cruise. Such an installation would employ conventional rotating machinery gas turbines for take-off and climb. At cruise, the rotating machinery 86 would be idled and hence no spanwise ducting would be required, with the thrust provided by the underwing ram-jet. Again, restriction of the ram-jet to cruise speeds would eliminate the afterburner type noise around airports for taxi, take-off, and climb.

The location of the spanwise manifold 87 or ram-jet structure at the leading edge 48 of the wing suggests its further use as a leading edge flap to provide an increase in wing area and camber for take-off and landing.

The upflow mechanism is directed towards reduction of energy loss and drag from the two-dimensional wing characteristics. To the extent that this objective is met, there will be less necessity to employ extreme sweep to provide three-dimensional drag alleviation. The design can therefore avoid the major operational penalties associated with extreme sweep, and return to the more practical and efficient modest sweep configuration, as shown in FIG. 11.

The design arrangement accordingly will be a compromise of advantages and disadvantages, which at this point might simply be listed as follows.

1. Advantages
  a. Double lift/drag ($L/D$) ratio at cruise
    i. greater range, payload, ceiling
    ii. lower cost per seat mile
  b. Greatly reduced sonic boom
  c. Less sweep
    i. increased span and aspect ratio
    ii. less induced drag
    iii. more efficient lift of fuel to altitude
    iv. increased lift coefficient at take-off
  d. Increased lift curve slope
    i. less severe ground attitude
    ii. no droop nose
    iii. shorter front nose gear
    iv. less fuselage pitch in climb
  e. Improved propulsive efficiency
  f. Spanwise dry jet at take-off
    i. blown flap lift augmentation
    ii. reduced sideline noise
2. Disadvantages
  a. Added structure for spanwise jet manifold The overlay of FIG. 11 compares the above indicated general characteristics of the upflow SST with a conventional SST. The upflow system in general appears similar to large aspect ratio, modest sweep, subsonic transports, with pod engines 86 located forward and under the wing 42, but with the addition of a spanwise jet manifold 87.

This aft spreading of the pressure downstream by the upflow mechanism corresponds to a major alteration of the entire flow field. Thus instead of a strong shock 32$s$ below the wing providing the severe sonic boom 88 on the ground, the shock wave strength is greatly weakened 32$w$ by the longer chord/reduced angle wing system provided by the vortex flap mechanism 85, which spreads the pressure downstream with a corresponding reduced sonic boom 89, as illustrated by the comparative ground signatures of FIG. 5.

Concentration of the supersonic angular momentum discharge in the form of vorticity 60 at the aircraft altitude should enhance the mixing and dispersion to other altitudes of products of combustion from the aircraft engines 86, thus reducing the tendency of the pollution products to stratify or accumulate. Thus is another way in which waste energy can be recycled to accomplish a useful purpose.

It is clear from this disclosure and its accompanying set of figures that the means of providing upflow for a supersonic wing to reduce wave drag and the sonic boom have been described in detail, and the magnitude of the provisions disclosed may be varied according to engineering considerations for different conditions as required.

While the preferred form and method of employing the invention have been described and illustrated, it is to be understood that the invention lends itself to numerous other embodiments without departing from its basic principles.

Having thus described my invention what I claim as novel and desire to secure by Letters of Patent of the United States is:

1. An aircraft wing to fly at supersonic speeds, said wing comprising:
   a lower surface element which has a curvature concave downwards on at least a portion of its extent yet has a net positive angle of attack with respect to the flight direction; and
   a manifold including a nozzle, said manifold extends substantially the entire span of said lower surface element, and said nozzle is shaped to emit a supersonic jet of fluid at a pressure greater than atmospheric below said surface element, providing a sheet of said fluid under essentially the entire extent of said lower surface element, constituting an expansion field to cancel the asymmetric compression field from said surface element, transforming this compression energy into the rotational form of vorticity to provide a downstream upflow to said surface element to reduce its angle of attack and drag.

2. An aircraft wing per claim 1, where:
said nozzle is shaped to emit said jet of fluid with a skewed vertical velocity profile increasing downward.

3. An aircraft wing per claim 1, where:
said nozzle is located to emit said jet of fluid immediately forward of the leading edge of said lower surface element so that the expansion field from said nozzle coincides with said compression field from the forward portion of said surface element.

4. An aircraft wing per claim 1, where:
said lower surface element has its forward portion disposed at a negative angle.

5. An aircraft wing per claim 1, where:
said nozzle is located to emit said jet of fluid immediately forward of the leading edge of said lower surface element so that the expansion field from said nozzle coincides with said compression field from the forward portion of said surface element; and
said lower surface element has its forward portion disposed at a negative angle.

6. An aircraft wing per claim 1, where:
said nozzle is located below said lower surface element a sufficient distance such that a layer of air is interposed between said jet of fluid and said lower surface element.

7. An aircraft wing per claim 1, where:
said nozzle is shaped to emit said jet of fluid with a skewed vertical pressure profile decreasing downward.

8. An aircraft wing per claim 1, where:
said nozzle is shaped to emit said jet of fluid with a skewed vertical pressure profile decreasing downward and with a skewed vertical velocity profile increasing downward.

9. An aircraft wing per claim 1, where:
said nozzle is located below said lower surface element a sufficient distance such that a layer of air is interposed between said jet of fluid and said lower surface element; and
said nozzle is shaped to emit said jet of fluid with a skewed vertical pressure profile decreasing downward and with a skewed vertical velocity profile increasing downward.

10. An aircraft wing per claim 1, where:
said lower surface element has its forward portion disposed at a negative angle;
said nozzle is located below said lower surface element a sufficient distance such that a layer of air is interposed between said jet of fluid and said lower surface element; and
said nozzle is shaped to emit said jet of fluid with a skewed vertical pressure profile decreasing downward and with a skewed vertical velocity profile increasing downward.

* * * * *